United States Patent [19]
Bezek et al.

[11] Patent Number: 5,579,441
[45] Date of Patent: Nov. 26, 1996

[54] REFRACTION ALGORITHM FOR PRODUCTION SYSTEMS WITH CONTENT ADDRESSABLE MEMORY

[75] Inventors: John D. Bezek, Owego; Peter M. Kogge, Endicott, both of N.Y.

[73] Assignee: International Business Machines Corporation, Armonk, N.Y.

[21] Appl. No.: 290,628

[22] Filed: Aug. 15, 1994

Related U.S. Application Data

[63] Continuation of Ser. No. 879,250, May 5, 1992, abandoned.

[51] Int. Cl.$^6$ .................................................... G06F 17/00
[52] U.S. Cl. ................................. 395/51; 395/50; 395/64
[58] Field of Search .......................... 395/10, 11, 23–25, 395/50–51, 60, 64, 62, 75, 908

[56] References Cited

U.S. PATENT DOCUMENTS

| | | | |
|---|---|---|---|
| 4,860,213 | 8/1989 | Bonissone | 364/513 |
| 4,901,229 | 2/1990 | Tashiro et al. | 364/200 |
| 4,916,625 | 4/1990 | Davidson et al. | 395/62 |
| 4,941,102 | 7/1990 | Darnell et al. | 364/513 |
| 4,970,657 | 11/1990 | Wolf | 364/513 |

(List continued on next page.)

OTHER PUBLICATIONS

Press, "Expert System Benchmarks"; IEEE Expert, vol. 4 Iss. 1, pp. 37 –44; spring 1989.
Francioni, J. M. and Kandet, A. "A Software Engineering Tool For Expert System Design", IEEE Expert, Spring 1988, pp. 33–41.
Griffin, N. L. and Lewis, F. D., "A Rule Based Inference Engine Which is Optimal and VLSI Implementable, " TAI 89; Oct. 23-25 1989; pp. 246–251.

(List continued on next page.)

Primary Examiner—David K. Moore
Assistant Examiner—Tariq Rafq Hafiz
Attorney, Agent, or Firm—Baker, Maxham, Jester & Meador

[57] ABSTRACT

An array processor system is provided with a system to implement a refraction algorithm to prevent incorrect expert system rule firing based on stale or future data, in those production system expert systems which employ content addressable memories for storage of the expert system's facts and its processing control information. The computer system is especially suitable for system which have expert system resources, and there are generic applications of refraction which can be used in any architecture, from scalar to massively parallel, and an associative memory or content addressable memory. The system need not use the RETE algorithm. The computer expert system, has an inference engine and a refraction check mechanism. It is provided with a time stamping mechanism. The computer memory will have working memory elements associated with the processing elements of the array processor. The array processor has a content addressable memory. A knowledge base is stored in the computer memory, and this base can be distributed among processing elements or pickets of the system. Each processing element or picket will have memory directly or indirectly associated with the processing element. The time stamping mechanism will order and identify the working memory elements. The computer program which forms the basis for the inferencing process controller system has controls which work with the operations of rules provided for examination of information in the system representing facts. The inferencing process contains the constraints which are subject to refraction checking. The refraction check system prevents the rule from subsequent firings on stale data. The refraction check prevents a rule from firing using data asserted into the inferencing system at a time later than the rule was selected for evaluation by the inferencing process. With the expert system resources the computer system instruction processing unit uses the content addressable memory provided by the memory store working memory elements to store the knowledge base.

4 Claims, 4 Drawing Sheets

U.S. PATENT DOCUMENTS

| | | | |
|---|---|---|---|
| 4,975,865 | 12/1990 | Carrette et al. | 395/11 |
| 4,989,162 | 1/1991 | Tanaka et al. | 364/513 |
| 5,043,915 | 8/1991 | Suwa et al. | 395/51 |
| 5,047,951 | 9/1991 | Ono | 364/513 |
| 5,051,923 | 9/1991 | Tsukagoshi | 364/513 |
| 5,051,932 | 9/1991 | Inoue et al. | 364/550 |
| 5,063,522 | 11/1991 | Winters | 395/51 |
| 5,129,043 | 7/1992 | Yue | 395/51 |
| 5,133,045 | 7/1992 | Gaither et al. | 395/51 |
| 5,159,685 | 10/1992 | Kung | 395/908 |
| 5,164,912 | 11/1992 | Osborne et al. | 395/75 |
| 5,218,669 | 6/1993 | Kubayashi et al. | 395/51 |
| 5,224,206 | 6/1993 | Simoudis | 395/51 |
| 5,259,066 | 11/1993 | Schmidt | 395/54 |
| 5,263,127 | 11/1993 | Barabash et al. | 395/60 |

OTHER PUBLICATIONS

J. D. Bezek, "Decision Table Language And It's Parallel Execution Architecture—w/App. In Expert Systems" May 1994.

L. Brownston, R. Farrell & E. Kant "Programming Expert Systems In OPS5" 1985 pp. vii–305.

J. Giarratano, G. Riley "Expert Systems".

B. Hillyer & D. E. Shaw "Execution of OPS5 Production Systems On A Massively Parallel Machine" pp. 236–267.

M. I. Schor, T. P. Daly, H. S. Lee, B.R. Tibbitts "Advances In RETE Pattern Matching" pp. 226–232.

C. Forgy & A. Gupta "Preliminary Architecture of the CMU Production System Machine" pp. 194–197.

A. Gupta "Parallelism in Production Systems".

B. J. Garner & E. Tsui "General Purpose Inference Engine For Canonical Graph Models".

D. I. Moldovan "RUBIC: A Multiprocessor For Rule–Based Systems".

```
(defrule SampleRule
    (startflag      yes)
    (current_mode   stopped)
    (request        ?Option)
=>
    (assert (RunIt ?Option))
    (printout t "Operation " ?Option " has started." crlf)
)
```

REFRACTION ALGORITHM FOR PRODUCTION SYSTEMS WITH CONTENT ADDRESSABLE MEMORY

This application is a continuation of application Ser. No. 07/879,250, filed May 5, 1992, now abandoned.

FIELD OF THE INVENTION

This invention relates to computers or computer systems which perform logic inferencing and particularly to such systems which employ content addressable memories.

CROSS REFERENCE TO RELATED APPLICATIONS

The present application claims priority and is a continuation-in-pad of the following related co-pending patent applications:

PARALLEL ASSOCIATIVE PROCESSOR SYSTEM, J. W. Dieffenderfer; P. M. Kogge; P. A. Wilkinson; N. J. Schoonover; U.S. patent application Ser. No. 07/611,594, filed Nov. 13, 1990; and, COMPUTER SYSTEMS OPERATIONS CONTROL, J. D. Bezek; P. M. Kogge; U.S. patent application Ser. No. 07/699,410, filed May, 13, 1991; and, CONTENT ADDRESSABLE MEMORY COMPUTER SYSTEM J. D. Bezek; P. M. Kogge; U.S. patent application Ser. No. 07/699,413, filed May 13, 1991; and INFERENCING PRODUCTION CONTROL COMPUTER SYSTEM J. D. Bezek; P. M. Kogge; U.S. patent application Ser. No. 07/699,412, filed May 13, 1991.

These co-pending applications and the present application are owned by one and the same assignee, International Business Machines Corporation of Armonk, N.Y.

The descriptions set forth in these co-pending applications are hereby incorporated into the present application by reference.

GLOSSARY OF TERMS

While dictionary meanings are also implied by certain terms used here, the following glossary may be useful.
- Actions: In a rule based expert system, the processes to be carried out when the left hand side conditions of a rule are satisfied by facts in the working memory. Also referred to as the Right Hand Side.
- Array controller: A component, possibly micro-programmed, of a content addressable memory which controls the functioning of and the functions performed upon the memory array.
- Attribute: A property or characteristic of one or more entities and, in a data base, a data element—a word or bit or group of bits or words—which describes the properties of another data element which may represent an entity or another attribute.
- Computer: Any general purpose or specialized computing machine having at least an ALU (Arithmetic Logic Unit), a memory (general purpose store) and an operating system capable of handling and processing instructions and data which is to be processed in accordance with an instruction sequence processed by the computer, generally thought of as a computer system.
- Computer system: A computer which may include additional elements and generally does include a number of such elements which interact to perform a planned function. Generally, such elements may include mass storage for instructions and data, special stores for repetitive instructions, input and output functional elements including display, communication and printing interfaces and connections. A Turing machine is an example of a computer system, but generally computers employ more elements,. A SYSTEM/370 machine is a computer system, and similarly RISC SYSTEM/6000.
- Content Addressable Memory: A storage device or subsystem or pad of another memory system where data and instructions are defined by their contents or by pad of their contents rather than by their names and positions (addresses typically used by general purpose computers). Computers can have a CAM as well as additional storage. Commercially, in the past, CAMs have been used in large parallel machines. Examples include large SYSTEM/370™ systems and the CRAY™ computer, but other smaller systems have had such CAMs. Generally in CAMs, data is either addressed or accessed in an associative fashion from storage. A CAM at the minimum comprises two elements, a store (typically a CAM memory array) and a pattern register. It may also include a mask register, and typically it includes a match register. Also referred to as associative storage or associative memory.
- CAM: See Content Addressable Memory.
- Check List: Part of the algorithm processing structure described in U.S. patent application Ser. No. 07/699,410, U.S. patent application Ser. No. 07/699,413, and U.S. patent application Ser. No. 07/699,412. The check list is a list of rules, each of which as been selected for full LHS condition evaluation. Rules are placed onto the check list when sufficient facts have been added to working memory WM such that the inferencing algorithm (see U.S. patent application Ser. No. 07/699,412) is nearly guaranteed success in the evaluation.
- Conditional statement: See conditions.
- Conditions: In a rule based expert system, the set of tests which must be satisfied for a rule to be executed. Also referred to as the Left Hand Side.

[1] SYSTEM/370 and RISC SYSTEM/6000 are trademarks of International Business Machines Corporation, Armonk, N.Y., U.S.A.

- Co-processor: A computer element which acts in concert with another primary computer element. Typically, co-processors have been assigned specific processing tasks to perform, e.g. to handle either application programming—e.g. word processing; or I/O (input/output)—e.g. printing. Some co-processors may be used to process routines also handled by other co-processors of the same computer system.
- Data base: The store of data available to the system. There are generally hierarchical data bases, network data bases and relational databases.
- Entity: In a data base, anything about which information can be stored. This may include a concept, a physical element, or an event, a user, group or resource, such as a DASD (direct access storage device) data set or a tape volume that is defined to the resource access control facility.
- Expert system: A computer system with memory which processes information pertaining to a particular application which performs functions similar to that of a human who is an expert in the field of a particular application. It is similar to and sometimes is used interchangeably with a knowledge based system. It uses an inferencing engine, a knowledge base derived from selected human experts and knowledge engineering. Somewhat like a human expert, the computer system when running application programs can solve problems by drawing inferences from a collection of information that is based on expert human experience and problems that the system has previously encountered. It is in the field of artificial intelligence that expert systems are employed in commerce.

- Fact: A datum in the expert system which describes a known true, or valid, condition or state of the environment.
- Future data: Data added after a rule has been selected for processing and which cannot be included within the current instantiation of the rule's firing.
- General purpose computer: A computer which is not designed to perform too specialized a task. A general purpose computer may be of the kind represented by many machines in commercial use variously referred to as mainframes, workstations, and as business, personal or scientific computers. These machines may process instructions and data in serial and or in parallel. The word length may vary. These general purpose computers operate with a base operating system, may utilize additional operating systems, and have the capability of processing a program (software) written for use by the system. When the program is run, the operating system operates with instructions which are originally formulated for use by the computer for the particular operating system itself by processing a program by an interpreter or compiler. The interpreted or compiled program has been written in either a high level language or an assembler language by a person, or by extraction from other programs available to the system.
- Inference engine: Refers to the components of an expert system, a computer system having an expert system loaded, such as a (cluster of) connected processor(s) and associated software that apply principles of reasoning to draw conclusions from the information stored in a knowledge base.
- Knowledge base: The set of facts within the expert system. It is accessed in accordance with the programming rules established to direct expert system operation and is accessed during the processing of information by an expert system.

It is a data base that contains information about human experience in a particular application, and data resulting from any problems previously solved by a computer. Knowledge bases generally are some sort of relational data base but can be structured as other data bases.
- Language: A set of characters or convention and rules that is used for conveying information as a programming directive in a computer system. A language construct in a programming language is a syntactically allowable program or subroutine that may be constructed in accordance with the set of rules that make up the grammar of the language of a computer system. The grammar of the language is used as a paradigm for the computer to follow in processing operations. It defines the steps and sequences which are to be used in processing information to and from elements of the system including the ALU and storage. The language or language construct is the entire set of grammar used by the computer. A language subset is a specific defined pad of the language construct.

The language is implemented by a program entry in the form of a language statement provided by a user. The language and specific language subsets are the building blocks by which users make computers perform tasks for them.

- LHS: Left Hand Side. See conditions.
- Mask register: A component of a CAM which acts like a filter through which data in the pattern register is filtered before the memory array of the CAM is addressed or accessed.
- Memory Array: A group of storage or memory cells organized so that several strings of interrelated data, such as used in a relational data base, can be addressed or accessed and examined as to contents at the same time.
- Paradigms: Models or sets of computer operation control which may be used by a language but may be language independent. It is a basic computer relationship building block and defines a set of operations of a computer.
- Parallel computer: A computer which processes words or pads of words in parallel through an arithmetic logic unit or information processing unit (ALU) system as differentiated from serial processing.
- Pattern register: A component of a CAM which stores the criteria for evaluating data stored within the CAM memory array. The pattern register data is used to determine which, if any, datum rows within the memory array satisfy the desired search criteria.
- Precondition facts: Minimally changing facts which typically describe constants in the expert system's environment. Examples include initialization data. Contrast with trigger facts.
- Refraction: A component of a logic inferencing system which prevents a rule from firing more than once on the same set of facts.
- Relational data base: A database that is organized and accessed according to the relationships between data items. In a relational data base, relationships between data are expressed by means of tables in which, generally, rows are expressed to represent tuples, and columns represent attributes. As differentiated from other data bases, relational data bases use data values rather than pointers (hierarchical) or location (network) for data items resident in memory.
- RHS: Right Hand Side. See actions.
- RETE: An algorithm developed by Charles Forgy, 1979, which stores the rules' LHS conditionals in a network. This manner of storage allows the inference engine to examine only changes in the fact set against rule LHS conditions instead of needing to compare each new fact against every rule LHS condition. This accounts for the performance benefits brought on by the RETE algorithm. See reference set, below, for [3, at p. 35].
- RISC: A computer system which utilizes a reduced instruction set of instructions to process data. The instruction set is referred to as "reduced" as compared to other systems such as the mainframe systems represented by the SYSTEM/360™ and SYSTEM/370™ architectures.
- Rule: A two pad instruction in a rule based expert system. It consists of a set of conditional statements and a set of actions. The actions are carried out when the facts in the system satisfy the conditions of the rule.
- Stale data: A collection of facts which has already been used to fire a rule and which cannot, in themselves, be used to fire the same rule again.
- Trigger facts: Facts whose assertion trigger typically trigger the firing of one or more rules. Typically, the LHS conditions of a rule will require one or more precondition facts to be present and defined in a system. The one fact will typically emerge as the trigger fact which causes the rule to be fired. Contrast with precondition facts.
- Working Memory: The collection of facts in the inferencing system. This is another term for the knowledge base or the fact set.

• Working Memory Element: One fact in Working Memory.

REFERENCES USED IN THE DISCUSSION OF THE INVENTION

The following works are referenced as an aid for the reader. These works are incorporated by reference.
1. Bezek, J. David, "Decision Table Language and its Parallel Execution Architecture with Applications in Expert Systems," Ph.D. Dissertation, Watson School of Engineering, SUNY at Binghamton, N.Y. May 1990, Chapters 2 and 3.
2. Brownston, L., Farrell, R., Kant, E. and Martin, N., "Programming Expert Systems in OPS5". Reading, Massachusetts: Addison-Wesley, corrected printing, 1986.
3. Giarratano, J. and Riley, G., "Expert Systems, Principles and Programming". Boston: PWS-KENT, 1989.

BACKGROUND OF THE INVENTION

The present invention is a refraction algorithm for use in expert system inference engines which employ CAM. It was specifically developed to overcome unnecessary overhead which the RETE algorithm introduces when a CAM is employed. The present invention was developed to complement the algorithms described and set forth in the cited pending inventions: U.S. patent application Ser. No. 07/699,410, U.S. patent application Ser. No. 07/699,413, and U.S. patent application Ser. No. 07/699,412.

As background for the present invention, a search for literature and patents using keywords would bring forth may references. Representative of these are the following publications and patent citations. However, none of these seem particularly relevant to our invention.

Publications

1. Hillyer et. al, "Execution of OPS5 Production System on a Massively Parallel Machine": Explicitly, our invention does not require a multi-processor, or a massively parallel machine, even though it could be used there. Regardless of architecture the algorithms described herein are generic. It will be seen that Hillyer doesn't use CAM, and the present invention eliminates the need for RETE use.
2. Marshall Schor, et. al., "Advances in RETE Pattern matching" is similar to Hillyer et. al. It does not contemplate a CAM and our present invention eliminates the need for RETE use.
3. Charles Forgy, et. al., "Preliminary Architecture of the CMU Production System Machine" uses a multiprocessor architecture and no CAM.
4. Anoop Gupta, "Parallelism in Production Systems," was cited as reference 27 in [1]. Gupta discusses RETE, TREAT, DADO, etc., all variations on RETE, but he does not address CAM.
5. B. J. Garner et. al., "General purpose inference engine for canonical graph models," Discusses inferencing and inference engine in general. Does not detail architectures nor CAM and is thus not applicable to present invention.
6. Dan Moldovan, "RUBIC: A Multiprocessor for Rule-Based Systems," illustrates another reference that does not talk about CAMs, nor does it deviate from RETE or RETE-variant inferencing algorithms.
7. Peter Kogge, John Oldfield, Mark Brule and Charles Storman, "VLSI and Rule-Based Systems," in *VLSI for Artificial Intelligence,* Jose G. Delgado-Friad and Will R. Moore (eds), Boston: Kluwer Academic Publishers, 1989, pp. 95–108. The paper discusses use of CAMs for production systems, but CAMs are applied to the conventional RETE algorithm. Also, refraction is not considered or discussed.

Patents

European, U.S. and Japanese patent literatures are likewise dissimilar.
1. European patent application, 90306160.4, filed Jun. 6, 1990, deals with an optimization of the Beta nodes in RETE networks when operation of such an algorithm occurs on a plurality of processors, one of which is acting as slave. Our present invention does not use addressable Beta nodes nor RETE networks. Nor does it specifically indicate that a multiprocessing system is required (plurality of processors, regardless of control structure.) The present invention is a refraction algorithm for use in expert system inference engines which employ CAM and was specifically developed to overcome unnecessary overhead which RETE introduced when a such memories are employed.
2. U.S. Pat. No. 4,860,213, to Piero Bonissone of G.E. Corp., deals with a rule firing control structure by examining and manipulating (propagating) rule uncertainties. A refraction component, to prevent multiple errant rule firings on the same fact data subset, would thus be contained within the uncertainty information and the logic interpreting it. (See column 2, lines 31–53: conclusion detachment interval.) Our present invention does not use rule uncertainties. Further, this G.E. patent in no way addresses CAM memories.
3. U.S. Pat. No. 4,970,657, Daniel Wolf: does not use CAM at all, which significantly deviates from our present invention. Further, the Wolf teaching would use one or more antecedents in each rule, while our present invention makes no such limitation. Wolf also requires one conclusion, while our teaching makes no such limitation: we allow zero, one, or more than one conclusion. Per our vernacular, "conclusion" equates to a right hand side action. We also do not require use of any type of logic tree in our algorithms. When our invention is understood, it will be seen to provide a computer system which deals with the refraction check, not with the core of the inferencing process.
4. U.S. Pat. No. 4,901,229, to Tsutomu Tashiro et. al. could be interpreted to propose a slight modification on RETE method with CAM used to accelerate one queue of a BETA queue search. However, this patent appears to make no mention of RETE directly. In spite of this, Tashiro teaches an algorithm which has no suggestion of the present invention. This patent
  • uses a multiprocessor, while ours does not require this, and
  • they use CAM as a device for "latching another set of data which is composed of status data coincident with another condition described in a same rule". (This CAM latch is similar to the Beta queue processing in RETE networks.)

We do note use a CAM to store intermediate partial or full joins of other patterns (conditions) in the same rule.
5. U.S. Pat. No. 4,941,102, to Michael Darnell et. al., describes a debugger for an expert system inference engine. The described system does not address refraction nor underlying inference engine.
6. U.S. Pat. No. 4,989,162, to Toshiyuki Tanaka et. al., deals with a reasoning system which uses rules with certainty levels. Our invention does not use rule certainties, nor does it reason with uncertainties.

7. U.S. Pat. No. 5,047,951, to Kenji Ono, uses the rules and patterns to build inter-rule transition tables which the patent terms meta knowledge, being a graph of the transitions between all states of all variables. We use no such methods. Further, this patent does not use CAM and the inferencing logic does not deal with the rules and patterns as our does, but with a computed set of transitions between rules given the full set of variable conditions.
8. U.S. Pat. No. 5,051,923, to Toshihiro Tsukagoshi, discusses tool for tracing and monitoring inference engine processing. This patent does not address the internals of an inference engine, nor inferencing algorithms.
9. U.S. Pat. No. 5,051,932, to Haruki Inoue et. al., deals with a process control system using inferencing, fuzzy logic. This patent does not use CAM and does not detail any of their inferencing algorithms.

SUMMARY OF THE INVENTION

Our invention deals with the use of refraction in a computer system with particular application in an inference engine. The same system can be employed more generically as we will also describe.

In rule based production systems [2] (numbers in brackets [ ] refer to the works listed in the section entitled REFERENCES USED IN THE DISCUSSION OF THE INVENTION) known as refraction [2, pp. 62–64, 304–305] [3, pp. 388–389] is needed to properly manage the inferencing system. Refraction prevents a rule from firing more than once given the same set of data. It is a vital pad of the fact inferencing operation in any expert system.

When a fact, also called a working memory element (WME) is added to the fact set, also called working memory (WM), of an expert system, the rule preconditions, or left hand sides (LHS), are checked to see if they are potentially satisfied by the new WME. When all preconditions are satisfied by facts in WM, the rule is eligible for firing. Firing a rule consists of processing the right hand side (RHS) actions contained within that satisfied rule.

We believe that a refraction check, or refraction, is a vital pad of inference processing. If a satisfied rule were to have its RHS immediately executed, the expert system would quickly end up running rules in trivial loops. If a satisfied rule's RHS, when executed, does not delete one of the facts which caused the satisfaction (as is frequently the case) then, without any type of refraction check, the rule will become satisfied again on the same set of WMEs. This would be an erroneous operation of the inferencing system.

This invention describes a new refraction check algorithm, RCA, which complements the novel inferencing algorithm described first in [1] and in U.S. patent application Ser. No. 07/699,412. It will be noted that our prior work, referenced above as co-pending applications is related to [1]; however, our RCA has not been disclosed in the prior work. RCA is not part of [1] That inferencing algorithm described in the thesis and in the referenced co-pending application 07/699,412 is hereafter referred to as NIA. Like all other inferencing algorithms, NIA requires a refraction check for the reasons outlined above. Our RCA not only satisfies that need, but RCA provides a superior computer system when it is employed as we will describe.

These and other improvements are set forth in the following detailed description. For a better understanding of the invention with advantages and features, refer to the description and to the drawings.

BRIEF DESCRIPTION OF THE DRAWINGS

FIG. 3 is used in the explanations which follow that address the two major problems which the refraction algorithm must address.

Our detailed description explains the preferred embodiments of our invention, together with advantages and features, by way of example with reference to the drawings.

DETAILED DESCRIPTION OF THE INVENTION

Before considering our preferred embodiments in detail, we will describe the refraction problem in more detail to better set off the solution demonstrated by the present invention.

In NIA the addition of each WME to WM causes a test to be made to examine if the new WME might potentially satisfy particular rule LHS patterns. A typical rule consists of many patterns which check for precondition facts, those which are minimally changing, and trigger facts which signal the occurrence of some event and trigger a rule to be evaluated. Precondition facts typically describe constants in the environment.

A rule is placed onto the check list when all LHS patterns in a rule have at least one potential match. When a rule is taken from the check list for the refraction check or for RHS processing, there may exist many sets of WMEs in WM which would satisfy the LHS patterns. Each of these is termed a potential satisfaction fact set, Spot. Choosing one Spot makes it the current potential satisfaction fact set.

Two statements about rule and checklist timestamping need to be made clear:
1. When a rule instantiation is placed onto the check list, that instantiation of the rule on the checklist is timestamped with the current time stamp value. This timestamp plays a critical role in the check for the "future data" problem. The "future data" problem is described below.
2. When a rule fires, the global time stamp value in incremented. The rule is then timestamped to indicate when it last fired, i.e. the current firing or most recent firing of the rule. This will be critical in ensuring that the rule does not fire more than once on the same set of data. This is the "stale data" problem and is further described below.

Two main classes of problems which the refraction algorithm must address are:
1. Stale data: The firing of a rule R at time t cannot use the same set of facts as any firing of R prior to time t.

A subclass of Stale data is termed Concurrent trigger assertions. Let rule R1 fire and assert m facts, n of which are triggers for rule R2. R2 will thus have n (additional) instantiations on the check list. Only one of these instantiations may fire using the n asserted facts. This subclass is highlighted as there needs to be a special case test in RCA for it.
2. Future data: In the time between the moment when a rule goes onto the check list, t1, and when it is actually evaluated for LHS pattern satisfaction, t2, more facts may have been asserted. The facts asserted after time t1 cannot be used to bind to the rule which went onto the check list at time t1.

Two examples showing the need for refraction are now discussed. The first demonstrates the stale data problem; the second shows the future data problem.

Figures 3, 4:
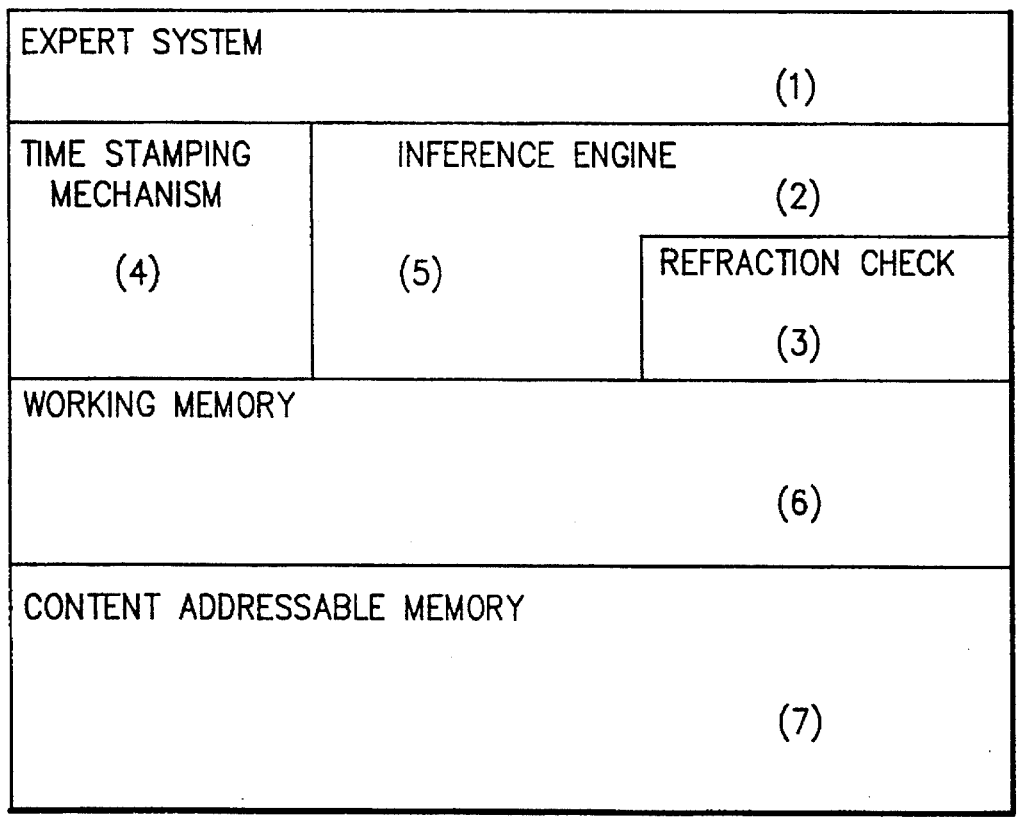
FIG. 3 is a rule, called Sample Rule, written in the CLIPS expert system language. For more information the C Language Integrated Production System Language (CLIPS), see reference [3]. This
FIG. 4 diagrams the overall architecture of the forward chained expert system with CAM as a subcomponent of the inferencing engine in accordance with the preferred embodiment of our invention, applicable to an inference engine in expert systems.

Consider the sample rule shown in FIG. 3. Assume that the facts
    (current_mode stopped)
    (request calibrate)
already exist in WM. Now let the fact
    (startflag yes)
be asserted into WM. These three facts will satisfy the three LHS patterns of the rule Sample Rule which now fires. Without a refraction check, the rule would be satisfied during the next processing iteration of the inferencing engine since the facts still reside in WM. The rule would fire again.

As a more subtle example, again using Sample Rule of FIG. 3, let the facts
    (current_mode running)
    (request sound_alarm)
be resident in WM. Now, let the following two facts be asserted
    (startflag yes)
    (current_mode stopped)
The first assert, (startflag yes), completes the LHS satisfaction check of the rule's LHS. According to NIA, the rule now goes onto the Check List. Notice that at this point the WMEs in WM will not satisfy the LHS patterns. The second assert places a second instantiation of Sample Rule onto the Check List, caused by the different current_mode fact. Notice now that there are WMEs in WM which will satisfy NIA and cause the rule to be fired. However, both instantiation copies of Sample Rule on the Check List will now be satisfied, and the rule will fire twice. This is incorrect as the first instantiation, at the time it entered the Check List, was not eligible for firing. A fact added later cannot be used to satisfy a previous potential rule firing, i.e. a rule entered onto the check list. RCA prevents this.

The Preferred Embodiment

We turn now to our invention in greater detail. The patentable technique described is a novel refraction algorithm for use with the inferencing algorithm described in U.S. patent application Ser. No. 07/699,412. This pair of algorithms are for use in inferencing systems which process forward chained reasoning systems and which use underlying high speed content addressable memory matching hardware. It is new, even though it employs the common practice of time stamping of data, because it was developed specifically to address the refraction requirement in the NIA, which required that RCA possess significant and intricate additions to merely placing a time stamp on a new fact.

This section describes the preferred solution to the refraction problem when the expert system employs CAM. The CAM, as used in this solution, contains two components of data:
1. Rule LHS matching patterns which new WMEs (facts) are applied to. This performs initial matches of WMEs to rules and is a critical part of the inferencing algorithm as described in U.S. patent application Ser. No. 07/699,412.
2. WMEs, i.e. facts. Once a rule is removed from the check list and is thoroughly examined for LHS condition satisfaction, the LHS patterns must be matched against WMEs in WM. This is performed in CAM against the stored WMEs. This is further described in U.S. patent application Ser. No. 07/699,412.

Figure 2:
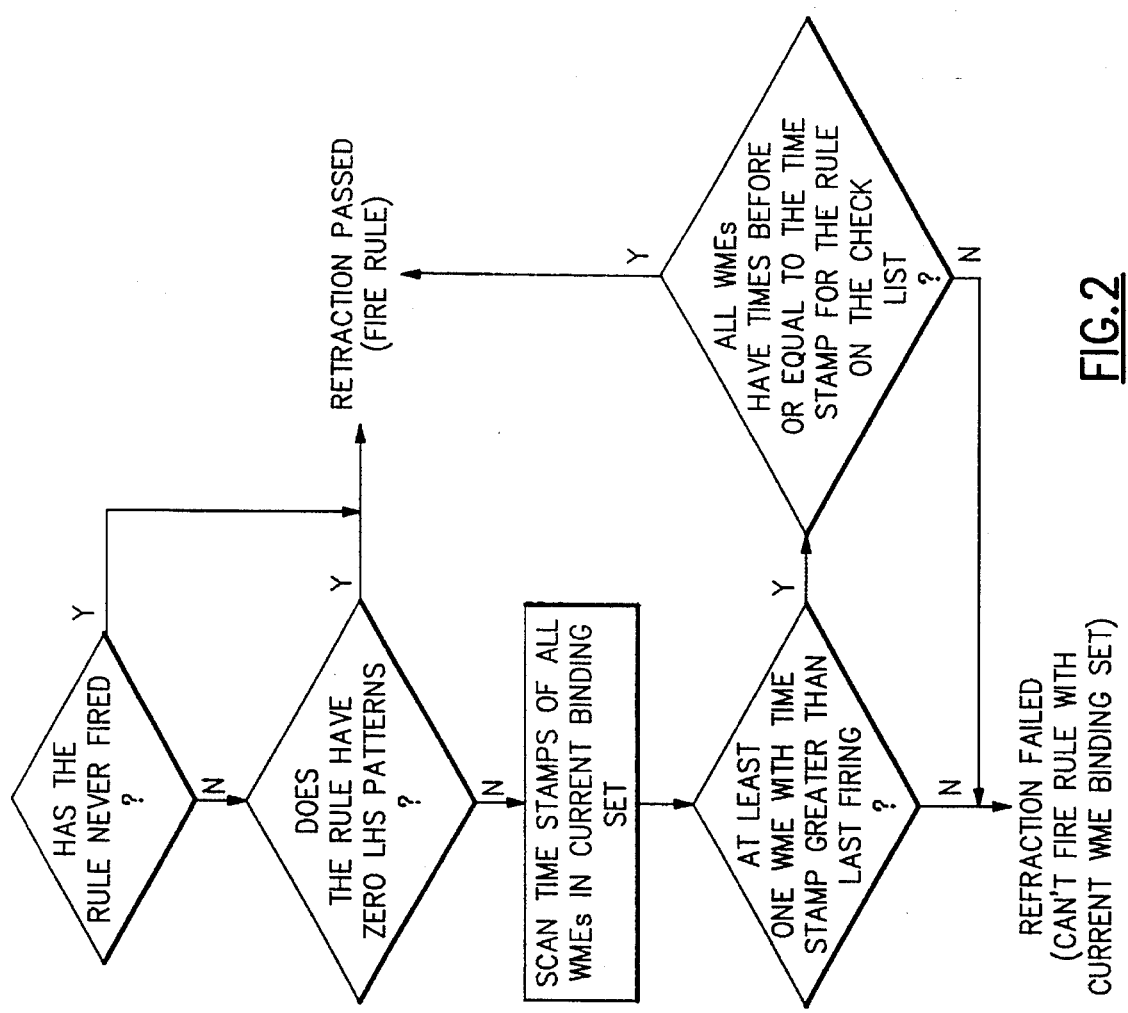
FIG. 2 shows our preferred refraction check algorithm, our RCA. It details the steps necessary for proper refraction checking when using CAM within the expert system inference processing engine as per the present invention.
Figure 1:
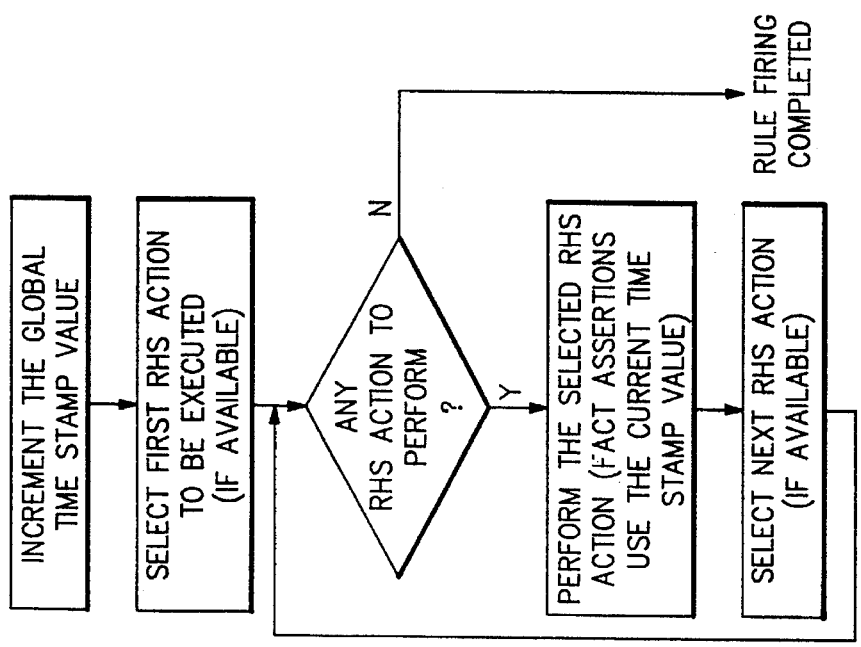
FIG. 1 shows schematically an overview of the preferred embodiment and particularly shows the process of firing a rule in the expert system inferencing environment. The reader will note the operation of incrementing the time stamp value. This is the significant link to FIG. 2 and shows the method by which the two figures interrelate.

The two accompanying flow diagrams, see FIGS. 1 and 2, describe the new refraction algorithm at the functional level. The description covers the three components of:
1. Adding a WME,
2. Firing a rule and time stamping, and
3. Checking a potential rule firing to ensure it is not a duplication.

Adding a WME

Adding a WME to WM involves two operations.
1. Put the current global time stamp value onto the WME. This gives a marker time value showing when, in the life of the processing of this set of rules, the WME was asserted. This will be needed later in refraction checking.
2. Place the WME into WM. This actually asserts the fact in the fact set and makes it available for potential LHS pattern binding by other rules.

When a CAM is employed in the inferencing process, these steps involve finding a free location in WM, i.e. in the CAM and inserting the WME into that location. Both of these operations are of order constant time, which is the benefit of using a CAM for the implementation.

Firing a Rule, Time Stamping

The process of rule firing is shown in FIG. 1. The time stamp plays a critical role in the processing of the RHS actions. Once a rule passes the refraction check operation, as described in the next section, it is fired. The critical first action is to increment the global time stamp value, which counts the number of rule firings. The RHS actions are now performed in sequential manner. Rule firing is completed when all RHS actions have been performed.

The global time stamp value is used for all facts asserted in a rule's RHS, as described in the previous section. The time stamp value appended to a WME (or WMEs) can thus be viewed as an indicator of which rule firing caused the WME(s) to be asserted. Since each successive rule firing increments the global time stamp value, only those WMEs collectively asserted during one rule firing, i.e. by one rule's RHS actions, will have the same time stamp value.

Rule Firing Duplication Check: The Refraction Test

The purpose of the refraction check is to ensure that a rule does not fire multiple times on one given set of matching working memory elements (WMEs). For example, this can occur if two WMEs of different class types are added to WM and both are used in rule R. Rule R would or could appear twice on the check list as, in this example, there are two potentially satisfying WMEs which would contribute to LHS pattern matching.

When a rule R fires, a given set of WMEs, S, form the set of satisfying facts for the rule's LHS patterns. It is referred to as the satisfaction set. The refraction algorithm ensures that any other appearance of R on the agenda, R', will have at least one element in its potential satisfaction agenda set, S', which is not in S. Thus, if R' fires at a later time, it is guaranteed that it will be over a different set of satisfying WMEs.

(Note: let WME W potentially satisfy pattern Px in rule R. Further, assume that W was the WME added to WM which caused this instantiation of R to appear on the check list. The only WME allowed, in any potential satisfaction set for this check list instantiation of rule R, bound to Px, is WME W. This will cover the stale data problem, except for concurrent trigger assertions, which is covered below. It guarantees that the particular check list instantiation will use the trigger fact which caused its appearance on the check list.)

Referring to FIG. 2, if a rule R has never fired or has no LHS tests, then a refraction check is not needed. Next, a scan of the time stamps on each fact in the current potential satisfaction fact set, i.e. those facts currently bound to the LHS patterns which will form the satisfaction set should the refraction check pass, is made. Two items are checked for:

1. Is there at least one WME in Spot which has a time stamp which is greater than the time stamp of the last firing of rule R? This ensures that the fact set contains at least one element which was not used in any previous firing of rule R. This covers the stale data problem, including concurrent trigger assertions.

2. Do all WMEs in Spot have time stamps which are smaller than or equal to the time stamp given to R when it was placed onto the check list? This ensures that no fact added to WM after R was placed onto the check list is used in:

- LHS pattern binding,
- The refraction check, or
- RHS action processing.

This test covers the future data problem.

This algorithm is especially valuable when a CAM is employed, allowing the time stamp comparisons to be performed in parallel and in constant time.

Alternative Preferred Embodiments

Both the preferred embodiment, and alternative embodiments may be employed in a computer system, whether it be scalar or a parallel system, whether it be a single processor, a multiprocessor, or a massively parallel machine. Our preferred expert system is thus schematically illustrated by FIG. 4. Our preferred embodiment is the system described generally in U.S. patent application Ser. No. 07/611,594, referenced above. However, the implementation of our invention is not limited to that particular embodiment of an array processor. Any embodiment of an array processor which has a content addressable area of memory could employ our invention. The processing element of the array could be embodied as illustrated the Parallel Associative Processor System illustrated by FIGS. 5, 6 and 7. which correspond to similar drawings in U.S. patent application Ser. No. 07/611,594 and as there described, all processing elements and memory could be formed on a single chip. However, the system which uses the invention could have separate processors chips, separate memory chips, and other more typical configurations.

Thus, FIG. 4 represents our preferred and alternative embodiments of our computer system which has expert system resources. The system will be an array processor functioning as an instruction processing unit, as shown in FIG. 4 having an expert system (1), and it will be provided with an inference engine (2) and a refraction check mechanism (3) as we have described. It is provided with a time stamping mechanism (4). The computer memory will have working memory elements (6) associated with the processing elements of the array processor. The array processor will have a content addressable memory (7). A knowledge base will be stored in the computer memory, and this base can be distributed among processing elements or pickets of the system. Each processing element or picket will have memory directly or indirectly associated with the processing element. The time stamping mechanism will order and identify the working memory elements. The computer program which forms the basis for the inferencing process control provides the control, preferably with the aid of a system controller, for performing the inferencing process we describe. These controls work with the operations of rules provided for examination of information in the system representing facts. The inferencing process contains the constraints which are subject to refraction checking.

The parallel associative processor system we have describe has a refraction check which prevents the rule from subsequent firings on stale data. The refraction check prevents a rule from firing using data asserted into the inferencing system at a time later than the rule was selected for evaluation by the inferencing process.

With the expert system resources the computer system instruction processing unit uses the content addressable memory provided by the memory store working memory elements to store the knowledge base. The inference engine, and the program inferencing process control, which may be located in an array controller, performs an inferencing process. This process has the capability to use content addressable memories, which are so controlled, for the storage of facts and for the processing of control information necessary for the refraction process.

In our preferred embodiment, the content addressable memory architectural component operates as a co-processor to the main processing portion of the computer system. This would be as illustrated in U.S. patent application Ser. No. 07/611,594. U.S. patent application Ser. No. 07/699,412.

Our preferred computer system has a data base and a content addressable memory and control means suitable for real-time environments, and has paradigm operators which make execution time of the refraction check independent of the number of entries in said data base, as we have described.

Before we turn to our preferred example of an associative processor, it will be useful to illustrate the alternative application of our scheduling system as applied to item or task scheduling.

Refraction within the expert system inference engine refers to not allowing a rule R to fire on data X1, X2, ... Xn at time T1, then allowing the same rule to fire on the same set of data at some later time, T2.

Refraction can be generalized in that if you have any list of tasks, [T1, T2, ... Tn] which we're calling the checklist, and you employ a CAM in the process of sequentially picking off the tasks: T1, then T2, ... then Tn you can say you need a refraction check if your job system doesn't want Ti to be processed for the set of data S if Tj has already been processed on the set S.

Here:

1) Job Ti and job Tj are the same job, but appear in two different locations on the list of tasks, OR
2) Job Ti and job Tj are the different jobs, appear in two different locations on the list of tasks, and have some restrictive exclusion or dependence property that if Ti processes over the input set S, Tj cannot process over the same set, or visa versa.

Then, our refraction check can be applied in an alternative and more general preferred alternative embodiment of a computer system. Our algorithm applied to the refraction checking mechanism of an inference engine with CAM is our preferred embodiment because it gives substantial improvements in performance and eliminates the overhead of a RETE system. However, in our alternative embodiment, scheduling can be applied to computer systems in a more generic system. Such systems could be as small as a workstation in which a cam card is installed. In this more generic case as CAMs have been used almost exclusively for cache tables and only very recently for LAN routing tables. However, this generalization application permits use of our system for scheduling with CAMs.

Such a computer system could have a cache, as an optional enhancement, as well as a mass store, such as a DASD device. However, the workstation will have the normal data processing unit and memory. The memory will include an addressable random access memory, and a content addressable memory. The system we described in our preferred embodiment will be employed in this alternative system. It provides a program control management system for processing data which includes for use in a scheduling system in which items or tasks are processed. The scheduling system processes tasks in a desired order based upon a set of data. This processing will, if items or tasks identified by the scheduling system are the same but appear at different locations in the system (memory), or appear to have two different locations in the system memory but have some restrictive exclusion or dependence property that would prevent an item or task to be processed with the same set of data, then schedule the tasks with the content addressable memory and its content. Such a workstation or data processing system would alternatively, and optionally, employ the content addressable memory for the processing of the tasks. It would employ our refraction check to process said data.

Embodiment for Computer System with a CAM or Associative Memory

Content addressable or associative memories have been addressed at the university level with various processing chips. There it was learned that for AI applications in certain cases it is valuable to base row selection on the results of previous search operations, with row logic. See VLSI for Artificial Intelligence, Jose G. Delgado-Frias and Will R. Moore, editors, Kluwer Academic Publishers, 1989, pp. 95–108, "VLSI and Rule-Based Systems", Peter Kogge, Mark Brule, and Charles Stormon for a discussion of applications. However, the elegant suggestions of others seem to direct the art in a different direction than we have followed. One form is that of Oxford's "Intelligent-Memory" chips for massive parallelism which was described in VLSI Systems Design, December 1988, pp. 18–28 in an article by the Senior Editor, Bob Cushman entitled Matrix Crunching with Massive Parallelism.

Our preferred system for using the inventions that we illustrated would be the workstation like our "Parallel Associative Array Processor" described in U.S. Ser. No. 611,594, which may be reviewed for more detail. However, even the prior an CAM system can employ our current invention.

Figure 5:
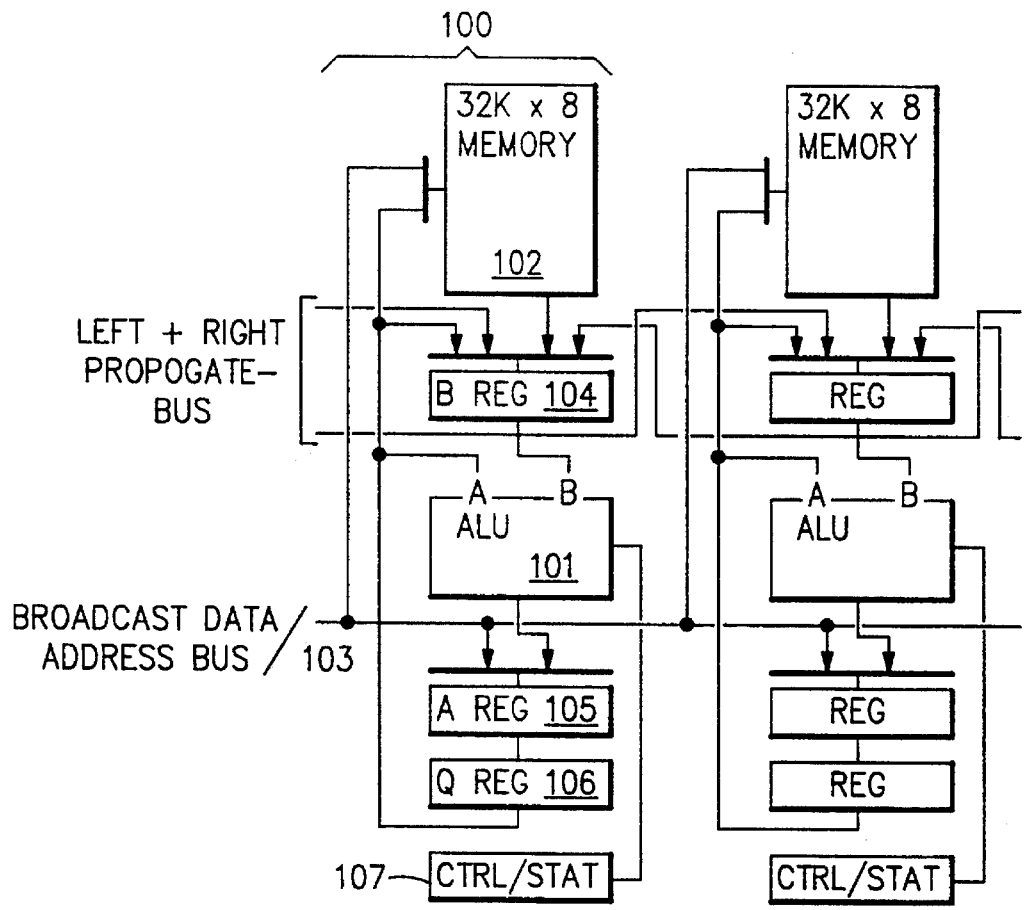
FIG. 5 illustrates a pair of the basic picket units which are configured on a silicon base with processor, memory, control logic and associative memory with byte communication with the other pickets in the array.

FIG. 5 illustrates the Parallel Associative Array Processor which we described in U.S. patent application Ser. No. 07/611,594 with a basic picket unit 100, comprising a combined processing element ALU 101 with a local memory 102 coupled to the processing element for processing one byte of information in a clock cycle. As illustrated, the picket unit is formed on a silicon base chip or Picket Chip with a linear array of Pickets with neighbors to the side (to the left and right in the figure) such that on a silicon base chip there is formed a picket processing array with a plurality of local memories, one for each of the byte wide processing data flows arranged in a logical row or in a linear array with neighbor communication busses for passing data bidirectionally to the right and left. The collection of pickets in a Picket Chip is arranged in a geometric order, preferably horizontally on the chip. FIG. 5 shows the typical implementation of two pickets of the picket array on a picket chip with multiple memory and dataflow including communication paths between each picker's processing element and memory. In our preferred embodiment, the data communication paths between the one-on-one memory with the processing elements of the array is byte wide and across, left or right with a neighbor or with a "slide" for communication with picket processors farther away.

A "slide" may be defined as means for transferring information in a single cycle to a non-neighbor position through a picket address location which would normally be able to receive the information were it not transparent to the message being sent until it arrives and is received at the nearest active neighbor which receives it. Thus a slide functions by sending information to a non-neighbor position across "turned off" pickets. Say picket "A" wants to transfer information to a remote picket "G". Prior to that cycle, intervening pickets are made transparent by turning these "B" through "F" pickets off. Then in the next single cycle "A" sends his message to the right and in doing so passes through "B" through "F" which are transparent because they are turned off and "G" receives the message since it is still turned on. In the normal use of the "slide", information is transferred linearly across the lattice, but the slide approach can also work with a two dimensional mesh, or in a multi-dimensional array.

The access of the processing elements in our preferred embodiment is not bit serial in operation, but rather byte serial. Each processor has access to its own coupled memory, rather than having access to a block of local memory and an associated partition or page thereof. Instead of one bit, a character wide, or character multiples wide bus is provided. Instead of a bit, a byte (or in future systems envisioned to duplicate the performance of a character byte, multiple bytes) of information is processed in one clock cycle. Thus, 8, 16 or 32 bits may flow between each picket processing element to match the width of the associated memory. In our preferred embodiment each picket chip has 8 (9) bits wide memory of 32Kbytes and preferably 16 pickets with this 32Kbytes each of storage per picket node of the linear array. In our preferred embodiment, each associated memory is founded in CMOS as DRAM, and a character byte is 9 bits (which functions as an 8 bit character with self checking).

The parallel path byte wide bus data flow between pickets and between the processing element and its memory is a substantial improvement over the serial bit structure of the prior art systems, but it will also be recognized after this achievement is recognized that the increased parallelism results in additional problems which need solution as one grows into the understanding of the implications of the newly achieved architecture. Important solutions are described herein.

A feature which will be appreciated is that in addition to the left and right neighbor transfers, and the slide mechanism which we have described with reference to the drawings, we have provided also a broadcast bus which is double byte wide, so that all pickets can see the same data at the same time. Picket control and address propagation is also transferred on this broadcast bus. It is this bus that supplies the comparison data when performing set association operations, and other comparison or synchronous math operations.

The tasks that have highly parallel data structures that lend themselves to processing within the picket data processing elements under the control of a single instruction stream include applications in artificial intelligence pattern matching, sensor and track fusion in multi-sensor optimal assignment, context searching and image processing. However, many of these applications now possible were not used in SIMD processes because the serial bit processing under a single clock time. For example, the traditional serial processing element of a SIMD machine executes one bit of an ADD operation for each processor cycle, while a 32 bit parallel machine can execute 32 bits of an ADD in one cycle.

The configuration of 32KB per processing element applies far more memory logically available to each processing element than the traditional SIMD machine provides.

Pin count on the chip has been held low because the data which is passed into and out of the chip has been kept to a minimum. The DRAM memory is a conventional memory CMOS array and one that supports "row-column" access by deleting the column demultiplexing on the back of the memory array, and providing a row address that reads out a row of the memory array to the data flows in parallel.

The memory, in addition to data, contains "tri-bits" or "trit", so that there are three states recognized by the logic, instead of the traditional binary digit, either logic 1, logic 0, or don't care. The don't care in a match field matches either a logic 1 or logic 0. The trit is contained in successive storage locations in the storage array. Masks are another form of data stored in memory that is directed to the mask register of the picket processing element.

As the storage array can contain commands, this allows one picket to do a different operation from another picket. On-chip control of individual pickets during operations involving most pickets, but not necessarily all, allows implementations which are unique for SIMD operations. One simple control function provided is that of suspended operations in any picket whose status output meets a specific condition. Thus a non-zero condition may mean a doze. Doze is a condition which suspends operations and turns the picket into an inactive but aware status. Another command provided is to inhibit or enable write to memory based on conditions in the picket, or based upon a command provided to the bus prior to a slide operation.

By applying to a picket chip 16 powerful pickets each with 32KB memory, only 64 chips provides 1024 processors and memory of 32768KB. The array of pickets comprises a set associative memory. The inventions are also useful for numerically intensive processing image analysis as well as vector processing. This powerful picket processing array can be packaged today on only 2 small cards! It will be seen that thousands of pickets can be appropriately packaged in a more portable low power package, enabling image processing applications to be performed with minimal delay or within video frame time, for instance, during the flight of an airborne craft without significant payload consideration.

The power of the pickets leads to the possibility of use of large associated memory systems packed into close quarters and enables the use of the processing power in a variety of applications after the systems designer becomes accustomed to use of the new system.

Figure 6:
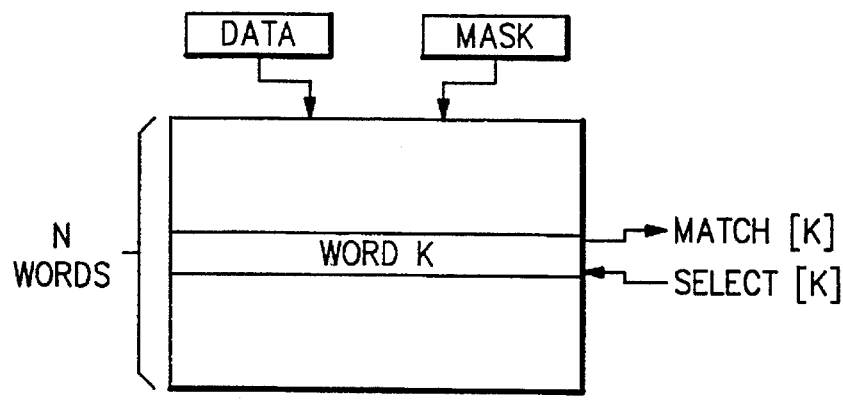
FIG. 6 illustrates associative memory processing.

FIG. 6 illustrates what might be termed fully associative memory or CAM in that, when an association is requested, a compare value is presented to all memory locations and all memory locations simultaneously respond with their match lines. Associative memory is known by itself in the art. In the system herein described, using parallel pickets of memory and processing elements which have byte transfers in order to perform a search, there is an input of data and a mask for a search in order to locate a word K among N words in memory. All matching pickets raise a status line, and then a separate operation reads or selects the first match K. This operation, commonly called set associative, can be repeated for successive words up through the picket memory. Similarly, writing is achieved via a broadcast operation in which a raised select line indicates participation and broadcast data is copied to all selected pickets.

Another embodiment, although not the preferred one reduces the amount of DRAM memory available for each picket to allow inclusion of a section of fully associative memory of the type portrayed in FIG. 6. If say 512 bytes of fully associative memory were included, then every picket could contain a set of search indexes and in a single operation, 512 times 1024 pickets yields 512k compares per operation or 512 Gig-compares per second at one microsecond per operation. With extensibility, the concept can be advanced into the multiple Tera-compare range. This embodiment empowers associative tasks that involve extensive searching for information with capabilities well in excess of computing capabilities today.

When this association operation using memory and byte wide coupled processing elements, as illustrated in FIG. 2, in addition to the applications of distinct algorithms or operations, artificial intelligence, and parallel programming attempted in SIMD situations, there are many additional applications now available for the machine with the configuration of the chip we describe in a SIMD environment which may include:

Simple parallelizable arithmetic tasks, including matrix multiply and other tasks which can be performed in specialized memory machines;

Image matching, and image processing tasks which can be performed in Von Neumann machines but which can be speeded up considerably with the applications adaptable to the extreme parallelism, for instance pattern matching of a three dimensional image;

Data based query functions;

Pattern matching in the Artificial Intelligence arena;

Network control in bridges to rapidly identify messages that go to a user on the other side of a bridge of a network;

Gate level simulation;

and checkers for VLSI ground rules violations.

Process tasks which take advantage of the bank of memories and associated processing elements will occur to application programmers as they invent to take advantage of the power of the new system architecture.

A process of keeping a description of a digital system can be enhanced by the use of the array to one gate or logic element per picket 100. In such a system, the process would begin by assigning each gate description as a list of signals that the gate accepts as inputs and naming the signal it generates. Require that each time a signal changes, its name is broadcast on bus 103 to all pickets and is compared in parallel with the names of expected input signals. If a match is found, record in the picket a new value of the signal in a dataflow register bit. When all signal changes have been recorded, cause all pickets to read out in parallel a control word which tells their data flow how to use the current set of inputs to compute the output. Cause these computations to be performed in parallel, with the results compared with the old value from the local gate. Record in a dataflow status bit all of those gates of the pickets whose outputs change. Cause an external controller to interrogate all the pickets and ask for the next gate that changed. Then broadcast the appropriate signal name and value from the picket to all other pickets, as originally stated, and repeat the cycle until no more signal changes occur or the process is stopped.

Another process would be a dictionary name search. Names are stored in picket memory 102 such that the first letter of all names can be compared with that of the desired broadcast name on broadcast data address bus 103. All pickets without a match are turned off with the control characteristic we provide. Then the second letter is compared and the compare and turnoff procedure is repeated for successive letters (characters) until no active picket units remain or the end of the word has been reached. At this point the remaining picket units are queried, and the index of the desired data is read out by the sequencer.

Figure 7:
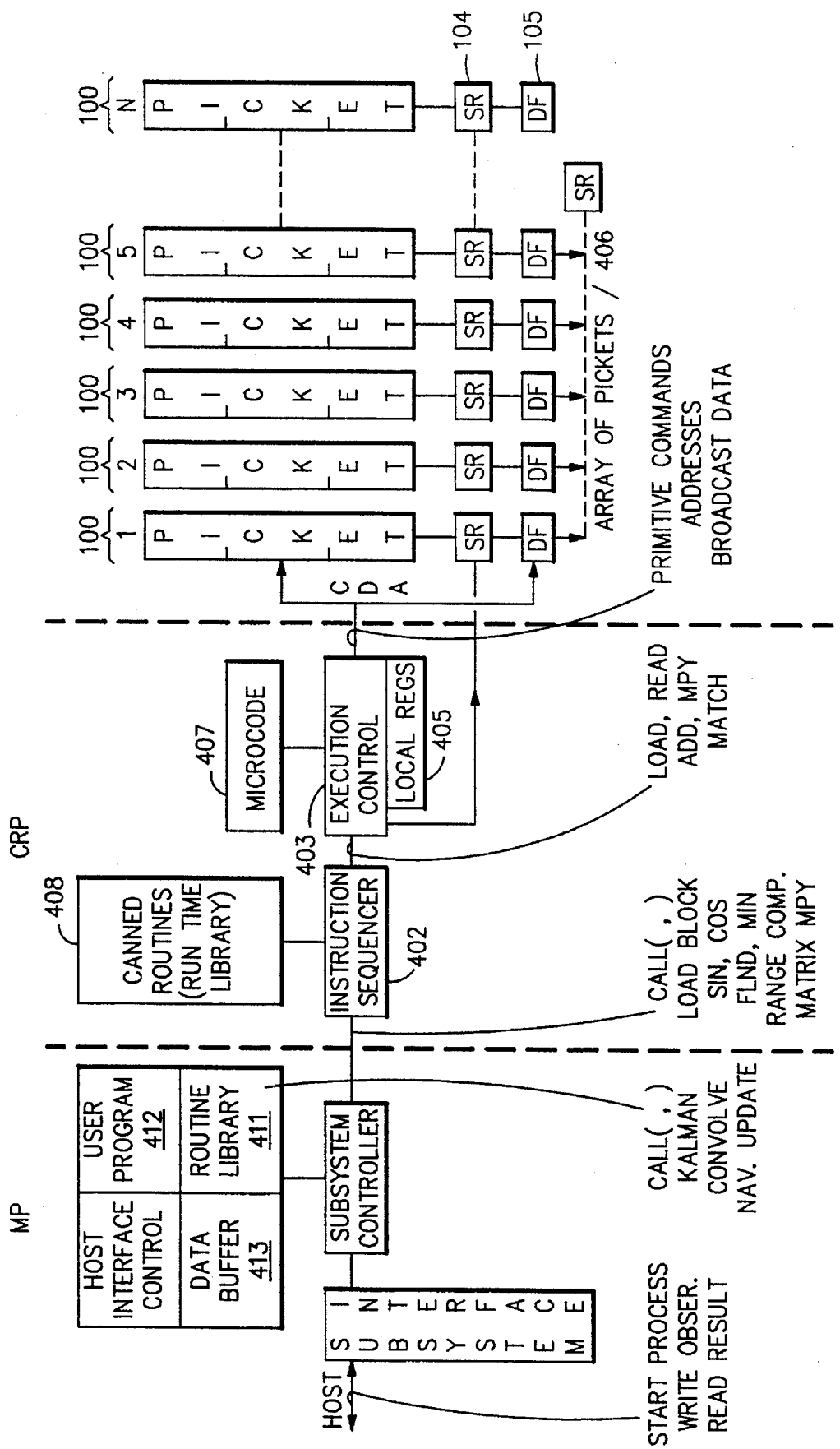
FIG. 7 illustrates a basic 16 (n) picket configuration for a SIMD subsystem which employs a microprocessor controller, a hardwired sequencing controller for canned routines, and a picket array and which forms the basic parallel picket processor system which may also be a stand alone unit.

FIG. 7 illustrates a basic picket configuration of a plurality of parallel processors and memories, picket units, arranged in a row on a single silicon chip as part of a parallel array which may be configured as a SIMD subsystem, illustrating the control structure of such a system. Therein also is illustrated the control processor and the supervisory microprocessor. It will be recognized that the associative computer system of the Parallel Associative Processor System, which is described in the co-pending application, can be used in the configuration of the illustrated a multiple picket processor system which incorporates a plurality of picket processors of FIG. 7. In FIG. 7, there is illustrated memory and parallel processing element logic on the same chip which within the FIG. 7 are shown in the section labeled Array of Pickets. Each memory is n bits wide, preferably a character wide, 8 (9) bits, as we have said, but conceptually also having a word width of multiple bytes wide memory. Thus, the memory portion of the parallel picket processor element will be preferably 8 (9) bits wide, or alternatively, 16, or 32 bits wide. With current CMOS foundry technology, we prefer to use an 8 bit or character wide associative memory (9 bit wide byte with self checking) with each picket processing element. The memories are directly associated one-on-one with a coupled processing element which includes an ALU, mask registers (A & Q used for masking), and a latch 104 (SP in FIG. 4), as well as status registers 107 and data flow registers A 105 and Q 106 (DF in FIG. 7) which are illustrated in greater detail in the Picket diagram of FIG. 5. The DRAM and logic of each picket processor do not have any burden of an interconnection network to contend with, for there is a direct one-on-one association between the multi-bit wide DRAM memory and its processing element on the chip itself.

It will be noted in FIG. 7 that the slide B register latch (SR) 104 is placed logically between the memory and the associated logic of the ALU of the processing element, and the latch becomes in essence a coupling port for each processing element along the picket array. Each picket chip comprises a plurality of parallel picket processing elements arranged in a line (which is illustrated as a straight bus) for communication with the picket control. A vector address bus is common to the memory, and a data vector address register controls what data passes across to each memory.

FIG. 7 also illustrates the interconnection between the main or microprocessor card MP which in our preferred embodiment is a 386 microprocessor configured as a PS/2 system, PS/2 is a trademark of International Business Machines Corporation, with a subsystem controller through which global instructions pass to a canned routine processor CRP which we have provided which provides the instructions for an instruction sequencer 402 and execution control 403 which executes the specific microcode called for by the instruction sequencer. This instruction sequencer might be analogized to a controller in function. However, also within the canned routine processor CRP we have provided local registers 405 which together with the local regs ALU (not shown) provide the basis for all addressing that is broadcast to all of the pickets within the picket array 406. In this way, address calculations are performed for all of the pickets in one ALU without using picket resources or conceivably without using picket execution cycles. This important addition adds control flexibility to the picket array, permitting doze, inhibit, and other control functions for specialized tasks to be performed and permitting pickets to be separated from any broadcast instruction or data function.

The instruction sequencer 402 with the loaded microcode 407 broadcasts to the array of pickets for execution under the SIMD instruction sequence determined by the main program microprocessor MP and by the canned routines of the canned routine processor CRP run time library 408 to enable SIMD processing of data contained in the array of pickets.

The instructions provided to the microprocessor MP via the subsystem interface are conceived to be high level process commands that might include Start Process, Write Obser. and Read Result which are passed to the microprocessor by the Subsystem controller of the microprocessor MP. The microprocessor can be considered as the main system or control processor in the subsystem arrangement illustrated in FIGS. 4. It will be understood that this unit could also be a stand alone unit with the addition of a peripheral input device (not shown) such as a keyboard and display unit. In this stand alone configuration the system MP could be considered to be a commercial PS/2 to which cards which include the sequencer card (which configures the canned routine processor) and the processor array cards are inserted in a card rack. For other details of a preferred embodiment which employs a CAM, and our alternative embodiment, consider the main system to be a workstation in which the content addressable memory, or associative memory we have described, along with RAM are coupled via a bus. Such a system could optionally have a cache, and a disc store.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A computer system having expert system resources, comprising:

a computer memory store, at least a portion of said computer memory store including a content addressable memory;

a knowledge base stored in said computer memory store including working memory elements stored in said content addressable memory, each of said working memory elements including a time stamp signifying a time of inclusion in said knowledge base;

an inference engine coupled to said knowledge base for performing an inferencing process, said inference engine including a plurality of rules;

first means in said inference engine for selecting a rule for execution by binding a set of working memory elements to said rule and for executing said rule in response to said set of working memory elements;

a time stamp mechanism for:
 generating time stamps;
 placing time stamps on working memory elements; and
 placing a first time stamp on said rule indicating a time when said rule was last executed and placing a second time stamp on said rule indicating a time said rule is selected for its next execution;

and, second means in said inference engine for comparing time stamps on said working memory elements to said first and second time stamps and permitting execution of said rule only if:
(1) at least one working memory element in said set of working elements has a time stamp indicating that said at least one working memory element was placed in said knowledge base after a time indicated by said first time stamp; and,
(2) the time stamps of all said working memory elements indicate that said all working memory elements were placed in said knowledge base earlier than a time indicated by said second time stamp.

2. The computer system of claim 1, wherein each of said time stamps has a value, the value of any time stamp being equal to a number of rules executed by the time the time stamp is generated.

3. The computer system of claim 1, wherein said second means prevents the rule from subsequent firings on stale data.

4. The computer system of claim 1, wherein said content addressable memory is for operating as a co-processor.

* * * * *